Уnited States Patent Office 3,450,174
Patented June 17, 1969

3,450,174
DISTRIBUTING DEVICE FOR MELTED CHEESE PACKAGING MACHINES
Robert Henri Jules Fievet, Paris, France, assignor to Fromageries Bel-La Vache Qui Rit, Paris, France
Continuation-in-part of application Ser. No. 403,257, Oct. 12, 1964. This application Oct. 3, 1967, Ser. No. 672,491
Int. Cl. A23c *19/00;* B67c *3/24*
U.S. Cl. 141—146         4 Claims

ABSTRACT OF THE DISCLOSURE

A distributing device comprising a cylinder receiving a liner which is movable vertically in response to a first cam, a piston being displaceable vertically through said liner in response to a second cam, whereby the melted cheese is discharged through a nozzle rigid with said liner, means being provided for adjusting the stroke of each piston to control the quantity of melted cheese to be discharged.

---

This patent application is a continuation-in-part of my earlier patent application Ser. No. 403,257 filed on Oct. 12, 1964, for "Melted Cheese Distributor for Machines for Packaging Melted Cheese Into Cocktail Cubes," now abandoned.

My present invention is directed to a melted cheese pouring or distributing device for machines for packaging melted cheese into cocktail cubes, said device comprising a rotary vat with a screw feeder, which vat is rigid with a rotating drum and provided with as many radial openings adjacent its bottom as there are work stations associated with said drum, it being possible to place each individual opening in communication, at the corresponding work station, with the internal chamber of a cylinder which is rigid with said drum, said cylinder receiving a bushing which in turn receives a liner which is movable vertically in response to a first cam, a piston being displaceable vertically through said liner in response to a second cam, whereby the melted cheese is discharged into a corresponding die bearing a preformed blank through a nozzle rigid with said liner and equipped with sealing means operable through the agency of opening and closing stops rigid with the drum and the cylinder respectively. In this way, the quantity of melted cheese is dispensed by said nozzle into the preformed blank remotely from the bottom thereof.

The invention is also directed to a device of the kind mentioned above, in which the second cam is formed by the juxtaposition, along its periphery, of two elements the cam-track portions of which respectively bear the top dead centre and bottom dead centre points of the piston stroke, the first element being adjustable vertically in response to a vertical translation device.

The description which follows with reference to the accompanying non-limitative exemplary drawings will give a clear understanding of how the invention can be carried into practice.

Figure 1:
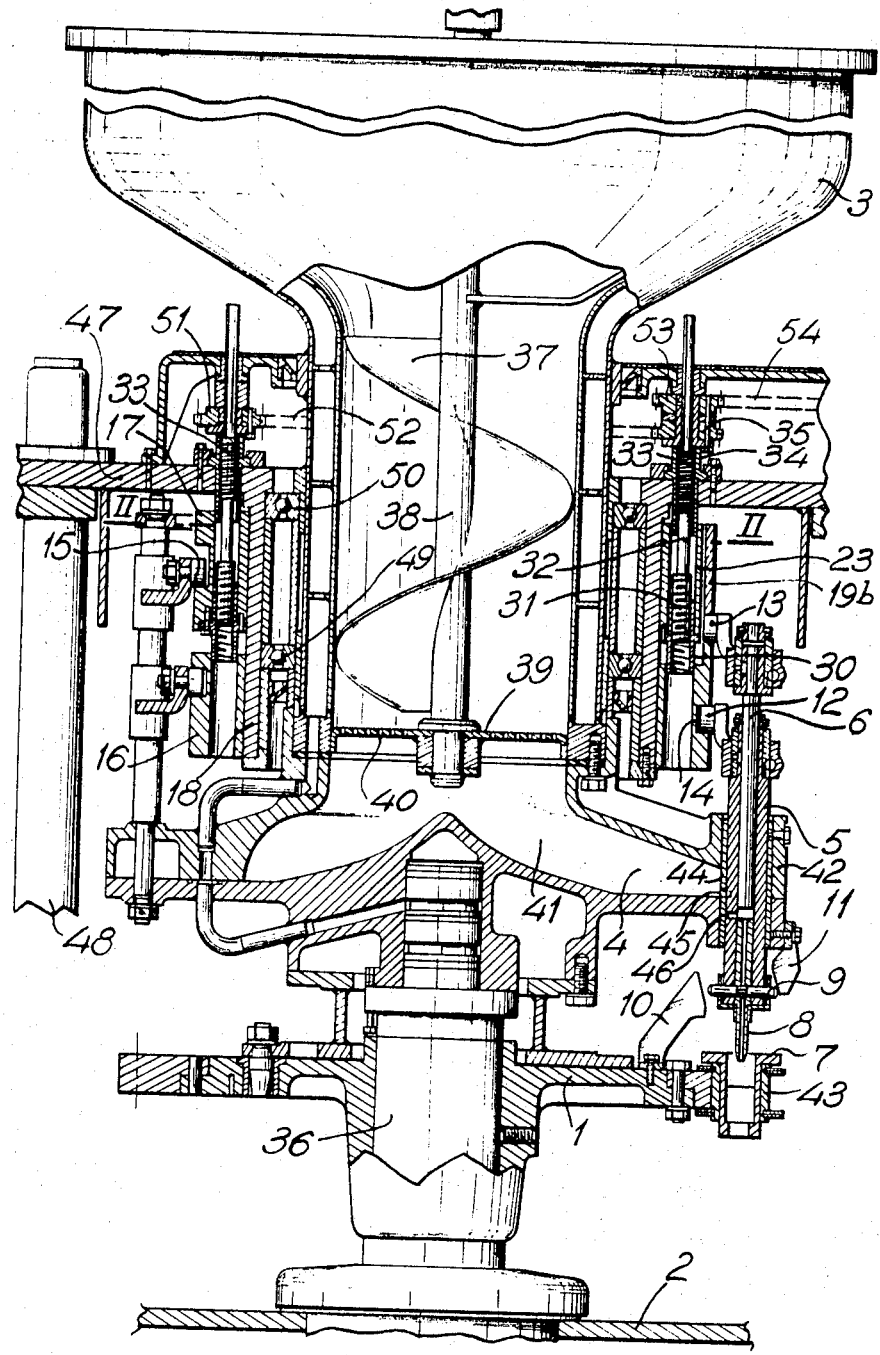
FIGURE 1 shows in fragmental section a basic unit work drum provided with a device according to the invention, as used for delivering melted cheese to a machine for packaging the cheese in cocktail cubes.

Referring to FIGURE 1, a work drum 1 of a basic unit 2 is utilized for proportioning and pouring melted cheese. The drum 1 is mounted on a rotating shaft 36 and is provided with a passageway for a hot fluid which circulates between the double walls of a vat 3 fixed to said work drum 1 and containing the melted cheese. This vat is equipped with a screw feeder 37 to the shaft 38 of which is driven by a motor (not shown), said shaft being supported on a vat web 39 having holes 40 therein. Beneath said web a chamber 41 is formed in the vat, which chamber communicates, at each work station of drum 1, through a radial passageway 4 with a vertical cylinder 42 integral with said vat and coaxial with a corresponding semicircular peripheral work drum opening which cooperates with a removable bushing 43 of an endless chain for transferring dies 7 on which the packaging operations are performed.

Into the bore of each cylinder 42 is secured a bushing 44 which communicates through a radial hole 45 with the passageway 4 in the base of the chamber 41. Into this bushing is fitted a liner 5 having therein a lateral hole 46 and this liner is driven in reciprocating motion by a follower 12 engaging with a fixed cam 16. Within said liner a piston 6 is displaceable under the action of a follower 13 engaging with a second cam 17 formed of two parts 17a and 17b the former part being adjustable vertically as will be explained in greater detail hereinafter.

Followers 12 and 13 roll on cam-tracks 14 and 15 formed in the cylindrical cams 16 and 17 which are positioned around a cylindrical bushing 18 connected to the basic unit 2 by means of a plate 47 and supporting columns 48, the vat 3 being rotatably mounted in said bushing 18 through the medium of ball-bearing 49 and 50.

The liner 5 bears at its lower end a nozzle 8 having an upper edge at the level of hole 46. The nozzle 8 can be opened or closed by a slide 9 having a central part of smaller cross-section and controlled by an opening cam 10 fixed to the work drum 1 and by a closing cam 11 fixed to the cylinder 42.

Figure 2:
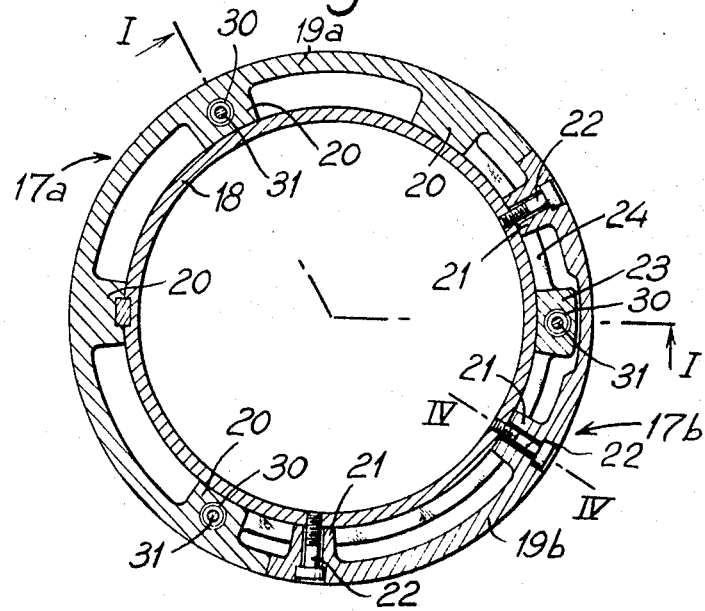
FIGURE 2 shows in section the device of FIGURE 1, along the line II—II of FIGURES 1 or 3, the vat being omitted.
Figure 4:
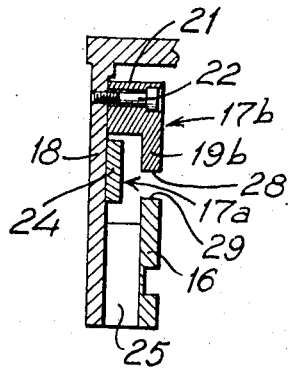
FIGURE 4 is a partial section of the device of FIGURE 1, taken along the line IV—IV of FIGURES 2 or 3.

The two parts 17a and 17b forming the cam 17 respectively comprise external portions 19a and 19b having mutually complementary cylindrical sector-shaped surfaces as shown in FIGURE 2. Of these portions 19a and 19b, the former is formed with internal guiding bosses 20 enabling it to slide on bushing 18 and the latter with internal fixing bosses 21 rigidly connected to bushing 18 by screws 22. The part 17a further includes another guiding element 23 which is positioned between two of the fixing bosses 21 of part 17b and which is rigidly connected to the end guiding bosses 20 by an annular part 24. The element 23 also slides on the bushing 18, and the annular part 24 is located beneath the fixing bosses 21 of part 17b, as shown in FIGURE 4.

The cam 16 is a single cylindrical part positioned beneath the portions 19a and 19b of parts 17a and 17b and having internal bosses 25 secured to bushing 18 by screws 26. Its cam-track 14 consists of a continuous groove formed along the entire perimeter of the cam. Cam-track 15 of cam 17 consists of a groove 27 formed along the periphery of part 17a, and of the space between the lower surface 28 of part 17b and the upper surface 39 of cam 16 which, in the zone of part 17b, is formed with a raised portion which rises to the level of the base of cam-track 27.

Figure 3:
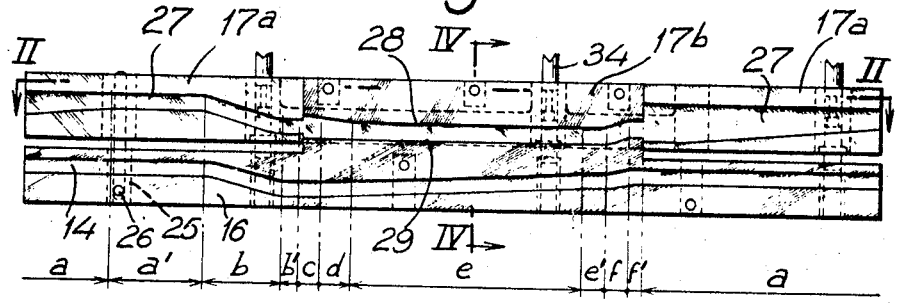
FIGURE 3 shows a development of the cams of the device shown in FIGURE 1.

As shown in FIGURE 3, cam-tracks 14 and 15 consist of a sequence of sections which, in the case of cam 16 and part 17a, correspond to motions which are horizontal and ascending (section *a*: suction), horizontal (section *a'*), descending (section *b*: descent of liner-piston assembly), horizontal (section *b'*), and, in the case of cam 16 and part 17b, horizontal and descending (section c: ejection), ascending and descending (section d: ejection), ascending and horizontal (section e: ejection), horizontal (section e'), ascending (section f: ascent of liner-piston assembly) and horizontal (section f').

Two of the guiding bosses 20 of part 17a and the guiding element 23 thereof receive, in tapped parts 30, lower screw-threads 31 of double-threaded vertical rods 32 the upper screw-threads 33 of which are screwed into fixed tapped parts 34 rigid with plate 47 and have a pitch less than or opposite to that of the lower screw-threads 31. The function of this system is to permit vertical displacement of the part 17a whereby to adjust the quantity of melted cheese to be dispensed into the dies between two limit values. Onto two of said rods 32 are keyed sprocket wheels 51 linked through a chain 52 to one of the wheels 35 of a compound sprocket wheel 35-53 keyed to the other vertical rod 32. The wheel 53 is driven by a chain 54 connected to any convenient manual or mechanical operating means.

The system described hereinabove functions in the following manner:

When a die 7 equipped with a preformed blank enters the work drum 1, the liner 5 is placed in its upper-most position by the cam 16, the piston 6 has nearly reached the upper limit of its suction stroke by its engagement with adjustable part 17a and the slide 9 is in its closed position. In the course of the motion described by the working drum 1 to move the die it has just received from the previous transfer drum into position for transfer to the next drum, the piston 6 reaches its uppermost position at the end of the stroke and sucks the melted cheese from the chamber 41, through the holes 45 and 46, into the internal chamber of the liner 5 formed between the piston 6 and the nozzle 8. The assembly comprising the liner 5 and the piston 6 is then lowered by cam 16 and part 17a at the same time that the slide 9 opens in response to cam 10.

When the liner and piston assembly has been lowered so that the liner occupies its lowermost position and the slide 9 is opened, the piston 6 begins ejection of the melted cheese through the nozzle 8, in response to part 17b. The nozzle 8 is then carried upwards by the liner 5 in response to cam 16, and ejection takes place through the reciprocal motion of the piston and the liner and then through the upward motion of the liner alone, at the same time as slide 9 begins to close in response to fixed cam 11. The liner/piston assembly subsequently rises responsively to part 17a and cam 16 and slide 9 closes as this upward motion is completed. The die 7, the prefromed blank of which is thus supplied with melted cheese, then leaves the work drum 1 and moves to the next transfer drum and in the course of the motion accomplished by said work drum between the subsequent and preceding transfer drums, the piston 6 is raised by the part 17a and begins to suck in melted cheese from the chamber 41.

In addition, it is possible to use the differential screw-thread system 31-33 to vary the level of part 17a, that is to say the uppermost point of piston cam 17, while the lowermost point thereof (part 17b) remains at the same level, thereby modifying the piston stroke and hence the quantity of cheese to be discharged.

What I claim is:

1. A distributing device for melted cheese comprising in combination, a rotating drum adapted for carrying at least one die into which melted cheese is to be introduced, a vat containing melted cheese and carried by said drum for rotation therewith, said vat being provided with a radial opening for each die, a cylinder mounted on said drum at each said opening, in communication therewith, and in alignment with a respective die, a rotary screw feeder in said vat, a bushing secured in each cylinder and having a radial hole communicating with the corresponding radial opening in said vat, a reciprocable liner fitted into each bushing and having a lateral hole, a first cam follower rigid with each liner, a first fixed cam coaxial with said drum and engaging each said first follower, a piston reciprocally mounted in each liner, a second cam follower rigid with each piston, a second cam coaxial with said drum and engaging each said second follower, a distribution nozzle mounted in each liner and having an upper edge at the level of the corresponding lateral hole and an axial duct, each liner and associated piston being driven in respective reciprocation by said cams and followers to draw melted cheese into the associated cylinder and to urge the cheese into the distribution nozzle, a horizontal slide mounted for transverse sliding movement in each liner and in the corresponding nozzle for controlling outflow of cheese from the nozzle, said slide having a central part of reduced cross section, a opening cam fixed to said drum for aligning the central part of each slide with the duct of the corresponding nozzle whereby melted cheese can now be discharged from the nozzle, a closing cam fixed to each cylinder for displacing the slide to close said duct of the corresponding nozzle, and means for adjusting the stroke of each piston to control the quantity of melted cheese to be deposited into each die.

2. A device according to claim 1, wherein said first and second cams are cylindrical and said second cam is formed by the juxtaposition, along its periphery, of a first part having a first cam-track bearing a top dead centre point and a second part having a second cam-track bearing a bottom dead centre point and joining substantially at its two ends with said first cam-track.

3. A device according to claim 2, wherein said first cam is positioned beneath said second cam whereby to provide a space between said first cam and said second part and wherein said first cam-track is a continuous peripheral groove formed in said first cam and said second cam-track is formed, in succession, along the periphery of the device, by a peripheral groove embodied in said first part, followed by said space.

4. A device according to claim 2, wherein the means for adjusting the stroke of the piston comprises a nut and screw device, said nut being connected to said first part, and means for driving the screw of said device in rotation.

References Cited

UNITED STATES PATENTS

| 1,046,762 | 12/1912 | Fleming et al. | 141—146 XR |
| 1,438,483 | 12/1922 | Garrett | 141—147 |
| 1,506,851 | 9/1924 | Martin et al. | 141—146 XR |
| 2,187,615 | 1/1940 | Ayers | 141—146 XR |
| 2,433,061 | 12/1947 | Pearson et al. | 141—146 XR |
| 2,578,732 | 12/1951 | Nordquist | 141—146 |
| 2,896,676 | 7/1959 | Minard | 141—146 |
| 3,335,921 | 8/1967 | Gellatly | 141—147 XR |
| 3,400,739 | 9/1968 | Dardaine et al. | 141—146 |

FOREIGN PATENTS 963,011    7/1964    Great Britain.

WALTER A. SCHEEL, Primary Examiner.

JOHN M. NEARY, Assistant Examiner.

U.S. Cl. X.R.

99—243; 141—147, 284